(12) United States Patent
Kwon

(10) Patent No.: US 12,627,886 B2
(45) Date of Patent: May 12, 2026

(54) FOCAL LENGTH MEASURING DEVICE AND METHOD

(71) Applicant: K-LAB CO., LTD., Gunpo-si (KR)

(72) Inventor: Goo Cheol Kwon, Gunpo-si (KR)

(73) Assignee: K-LAB CO., LTD., Gunpo-si (KR)

( * ) Notice: Subject to any disclaimer, the term of this patent is extended or adjusted under 35 U.S.C. 154(b) by 85 days.

(21) Appl. No.: 18/853,408

(22) PCT Filed: Feb. 23, 2023

(86) PCT No.: PCT/KR2023/002602
§ 371 (c)(1),
(2) Date: Oct. 1, 2024

(87) PCT Pub. No.: WO2023/204423
PCT Pub. Date: Oct. 26, 2023

(65) Prior Publication Data
US 2025/0220304 A1 Jul. 3, 2025

(30) Foreign Application Priority Data
Apr. 21, 2022 (KR) ........................ 10-2022-0049241

(51) Int. Cl.
*H04N 23/67* (2023.01)
*H04N 23/55* (2023.01)

(52) U.S. Cl.
CPC ........... *H04N 23/673* (2023.01); *H04N 23/55* (2023.01)

(58) Field of Classification Search
CPC ...... H04N 23/673; H04N 23/55; H04N 23/60; H04N 23/67; H04N 23/54; G01B 11/0608;
(Continued)

(56) References Cited

U.S. PATENT DOCUMENTS

| | | | |
|---|---|---|---|
| 9,756,235 B2 | 9/2017 | Kindaichi et al. | |
| 2015/0060421 A1* | 3/2015 | Tami ................. | B23K 26/0853 |
| | | | 219/121.77 |

(Continued)

FOREIGN PATENT DOCUMENTS

| | | |
|---|---|---|
| JP | 2010-213105 A | 9/2010 |
| JP | 2020-046637 A | 3/2020 |

(Continued)

OTHER PUBLICATIONS

Ugur Çilingiroglu, Sicheng Chen, Range sensing with a Scheimpflug camera and a CMOS sensor/processor chip, IEEE Sensors Journal, vol. 4, No. 1, (Year: 2004).*

*Primary Examiner* — Abdelaaziz Tissire
(74) *Attorney, Agent, or Firm* — Bridgeway IP Law Group, PLLC; Sang Ho Lee; Hyun Woo Shin

(57) ABSTRACT

A focal length measuring device, which is provided in a work device that performs work on a workpiece, and measures a focal length at which a lens provided in the work device is separated from the workpiece, includes: an image acquisition unit disposed in a movement path of light incident from the workpiece through the lens and configured to acquire an image from the workpiece; an image extraction unit configured to extract a plurality of first divided images from the image acquired by the image acquisition unit and select at least one second divided image having a sharpness greater than or equal to a preset reference from among the plurality of first divided images; and a focal length calculation unit configured to calculate a focal length of the workpiece from a position of each of the at least one second divided image selected by the image extraction unit, wherein the image acquisition unit is disposed to have a preset angle with respect to a direction perpendicular to the movement (Continued)

path of the light incident from the workpiece through the lens.

9 Claims, 9 Drawing Sheets

(58) Field of Classification Search
CPC .. G02B 7/365; G02B 7/38; G06T 7/80; G06T 2207/10148; G06T 7/10; G06T 7/60
See application file for complete search history.

(56) References Cited

U.S. PATENT DOCUMENTS

2017/0328807 A1* 11/2017 Kwon .................. B23K 26/048
2021/0235059 A1* 7/2021 Kim ........................ H04N 23/54

FOREIGN PATENT DOCUMENTS

| KR | 10-0090801 B1 | 6/1995 |
| KR | 10-0790706 B1 | 1/2008 |
| KR | 10-2010-0056266 A | 5/2010 |
| KR | 10-2017-0128952 A | 11/2017 |
| KR | 10-2112721 B1 | 5/2020 |
| WO | 2021/010528 A1 | 1/2021 |

* cited by examiner (a)

(b)

(a)

| f(1, 5) | f(2, 5) | f(3, 5) | f(2, 5) | f(5, 5) |
|---------|---------|---------|---------|---------|
| f(1, 4) | f(2, 4) | f(3, 4) | f(2, 4) | f(5, 4) |
| f(1, 3) | f(2, 3) | f(3, 3) | f(2, 3) | f(5, 3) |
| f(1, 2) | f(2, 2) | f(3, 2) | f(2, 2) | f(5, 2) |
| f(1, 1) | f(2, 1) | f(3, 1) | f(2, 1) | f(5, 1) |

~111

(b)

~111

C

FOCAL LENGTH MEASURING DEVICE AND METHOD

TECHNICAL FIELD

The present disclosure relates to a focal length measuring device and method, and more particularly, to a focal length measuring device and method capable of easily and accurately measuring a focal length of a work device with respect to a workpiece with a simpler structure and control method.

BACKGROUND ART

In general, laser processing devices, such as laser marking devices and laser welding devices, and devices that perform various types of work (hereinafter referred to as work devices) are provided with an optical system for irradiating a laser beam or the like onto a workpiece.

In order for such work devices to perform work on the workpiece more stably and efficiently, it is very important to accurately measure and control the focusing state of the optical system provided in the work device with respect to the workpiece. In particular, in order to improve work quality of a workpiece on which work is performed, a focal length, which is a distance from a lens provided in a work device to a workpiece, is a very important measurement factor.

For example, the laser marking device, which is one of the laser processing devices, is a device that receives characters, figures, or the like from the outside and controls the operations of a laser generator and a laser scanner to mark the characters, figures, or the like on a workpiece with a laser beam. Since the size (spot size) of the laser beam irradiated by the laser scanner is several μm to several tens of μm, it is very important to maintain the focal length accurately and consistently.

As such, there are various methods for measuring and determining a focal length of a work device with respect to a workpiece, but most focal length measuring devices use various types of sensors to measure a focal length, or use a charge coupled device (CCD) camera or the like to capture a pattern formed on a workpiece and then determine a focusing state through image processing.

For example, Korean Patent Registration No. 10-0790706 (Lens Focal Length Measuring Device) (published on Jan. 2, 2008) discloses a technology for adjusting a distance between an inspection lens and an objective lens by adjusting the position of the inspection lens, which is an object for which a focal length is to be measured, finding a point at which a size of an image formed on a screen is minimum, and calculating the focal length of the inspection lens based on information about the point.

As another example, Korean Patent Registration No. 10-0090801 (Focal Length Measuring Device and Method of Optical System) (published on Jun. 26, 1995) discloses a structure of a focal length measuring device including a collimator unit that emits light parallel to an optical axis, an aperture unit that may adjust the amount of parallel light from the collimator unit, an optical system in which the parallel light having passed through the aperture unit is refracted, a CCD that detects light adjusted in the optical system, a conversion means connected to the CCD to convert the detected light into an electric signal, and a screen on which the refracted light is imaged.

However, conventional focal length measuring devices have the problem in that the structure of the device becomes complex and the cost increases because an imaging device such as a CCD camera, various types of sensors, and a driving means for moving an inspection lens are required. In addition, conventional focal length measuring devices have the problem in that the measurement time increases because the sizes of the images formed on the screen have to be compared while moving the inspection lens using the driving means.

Therefore, there is a need for a focal length measuring device and method capable of easily and accurately measuring a focal length of a work device with respect to a workpiece with a simpler structure and control method.

DISCLOSURE

Technical Problem

The present disclosure has been made to improve the problems described above, and the problem to be solved by the present disclosure is to provide a focal length measuring device and method, in which an image of a workpiece acquired by an image acquisition unit disposed obliquely in a movement path of light incident from the workpiece through a lens is divided into a plurality of first divided images and then the focal length of the workpiece is calculated by using the sharpness of each of the plurality of first divided images, thereby easily and accurately measuring a focal length of a work device with respect to the workpiece with a simpler structure and control method.

The technical problems of the present disclosure are not limited to those described above, and other technical problems that are not mentioned herein will be clearly understood from the following description by those of ordinary skill in the art.

Technical Solution

To achieve the objects described above, a focal length measuring device, which is provided in a work device that performs work on a workpiece, and measures a focal length at which a lens provided in the work device is separated from the workpiece, according to an embodiment of the present disclosure includes: an image acquisition unit disposed in a movement path of light incident from the workpiece through the lens and configured to acquire an image from the workpiece; an image extraction unit configured to extract a plurality of first divided images from the image acquired by the image acquisition unit and select at least one second divided image having a sharpness greater than or equal to a preset reference from among the plurality of first divided images; and a focal length calculation unit configured to calculate a focal length of the workpiece from a position of each of the at least one second divided image selected by the image extraction unit, wherein the image acquisition unit is disposed to have a preset angle with respect to a direction perpendicular to the movement path of the light incident from the workpiece through the lens.

At this time, the image acquisition unit includes a charge coupled device (CCD) image sensor.

In addition, the image extraction unit is configured to extract the plurality of first divided images by dividing an entire area of the image into a first direction perpendicular to the movement path of the light incident from the workpiece through the lens and a second direction perpendicular to the first direction and the movement path of the light incident from the workpiece through the lens.

In addition, the image extraction unit is configured to perform a fast Fourier transform (FFT) operation to extract a plurality of frequencies for the plurality of first divided images, and select at least one second divided image having a highest frequency from among the plurality of first divided images.

In addition, the focal length measuring device further includes a position adjustment unit configured to adjust at least one of an angle of the image acquisition unit, a position of the image acquisition unit, and a position of the workpiece according to a calculation result of the focal length calculation unit.

Meanwhile, to achieve the objects described above, a focal length measuring method for measuring a focal length at which a lens provided in a work device that performs work on a workpiece is separated from the workpiece, according to an embodiment of the present disclosure includes: a step in which an image acquisition unit disposed in a movement path of light incident from the workpiece through the lens acquires an image from the workpiece; a step in which an image extraction unit extracts a plurality of first divided images from the image acquired by the image acquisition unit; a step in which the image extraction unit selects at least one second divided image having a sharpness greater than or equal to a preset reference from among the plurality of first divided images; and a step in which a focal length calculation unit calculates a focal length of the workpiece from a position of each of the at least one second divided image selected by the image extraction unit, wherein the image acquisition unit is disposed to have a preset angle with respect to a direction perpendicular to the movement path of the light incident from the workpiece through the lens.

At this time, the step in which the image extraction unit extracts the plurality of first divided images includes a step in which the image extraction unit extracts the plurality of first divided images by dividing an entire area of the image into a first direction perpendicular to the movement path of the light incident from the workpiece through the lens and a second direction perpendicular to the first direction and the movement path of the light incident from the workpiece through the lens.

In addition, the step in which the image extraction unit selects the at least one second divided image includes: a step in which the image extraction unit performs a fast Fourier transform (FFT) operation to extract a plurality of frequencies for the plurality of first divided images; and a step in which the image extraction unit selects at least one second divided image having a highest frequency from among the plurality of first divided images.

The focal length measuring method further includes, after the step in which the focal length calculation unit calculates the focal length of the workpiece, a step in which a position adjustment unit connected to the image acquisition unit and the workpiece adjusts at least one of an angle of the image acquisition unit, a position of the image acquisition unit, and a position of the workpiece according to a calculation result of the focal length calculation unit.

Specific details of other embodiments are included in the detailed description and drawings.

Advantageous Effects

According to a focal length measuring device according to an embodiment of the present disclosure, an image of a workpiece acquired by an image acquisition unit disposed obliquely in a movement path of light incident from the workpiece through a lens is divided into a plurality of first divided images, and then the focal length of the workpiece is calculated by using the sharpness of each of the plurality of first divided images, thereby easily and accurately measuring a focal length of a work device with respect to the workpiece with a simpler structure and control method.

The effects of the present disclosure are not limited to those described above, and other effects that are not mentioned herein will be clearly understood from the description of the claims by those of ordinary skill in the art.

BEST MODE

Figure 1:
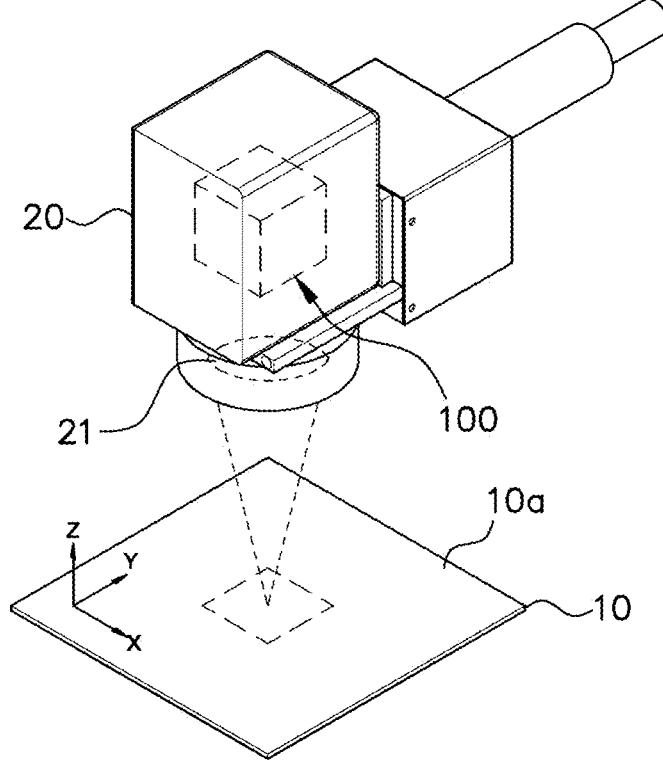
FIG. 1 is a diagram schematically illustrating a structure of a laser processing device to which a focal length measuring device according to an embodiment of the present disclosure is applied.

Hereinafter, preferred embodiments of the present disclosure will be described in detail with reference to the accompanying drawings, so that those of ordinary skill in the art can easily carry out the present disclosure.

In describing the embodiments, descriptions of technologies that are well known in the technical field to which the present disclosure belongs and are not directly related to the present disclosure will be omitted. By omitting unnecessary description, the present disclosure may be described more clearly without obscuring the gist of the present disclosure.

For the same reason, some elements in the accompanying drawings are exaggerated, omitted, or schematically illustrated. Also, the size of each element does not entirely reflect the actual size. The same reference numerals are assigned to the same or corresponding elements in the drawings.

In addition, it will be understood that the expressions and terms as used herein with respect to device or element orientation (e.g., "front," "back," "up," "down," "top," "bottom," "left," "right," "lateral," etc.) are only used to simplify the description of the present disclosure and do not necessarily indicate or imply that the relevant device or element should have a particular direction.

Hereinafter, the present disclosure will be described with reference to drawings for explaining a focal length measuring device according to an embodiment of the present disclosure.

Figure 2:
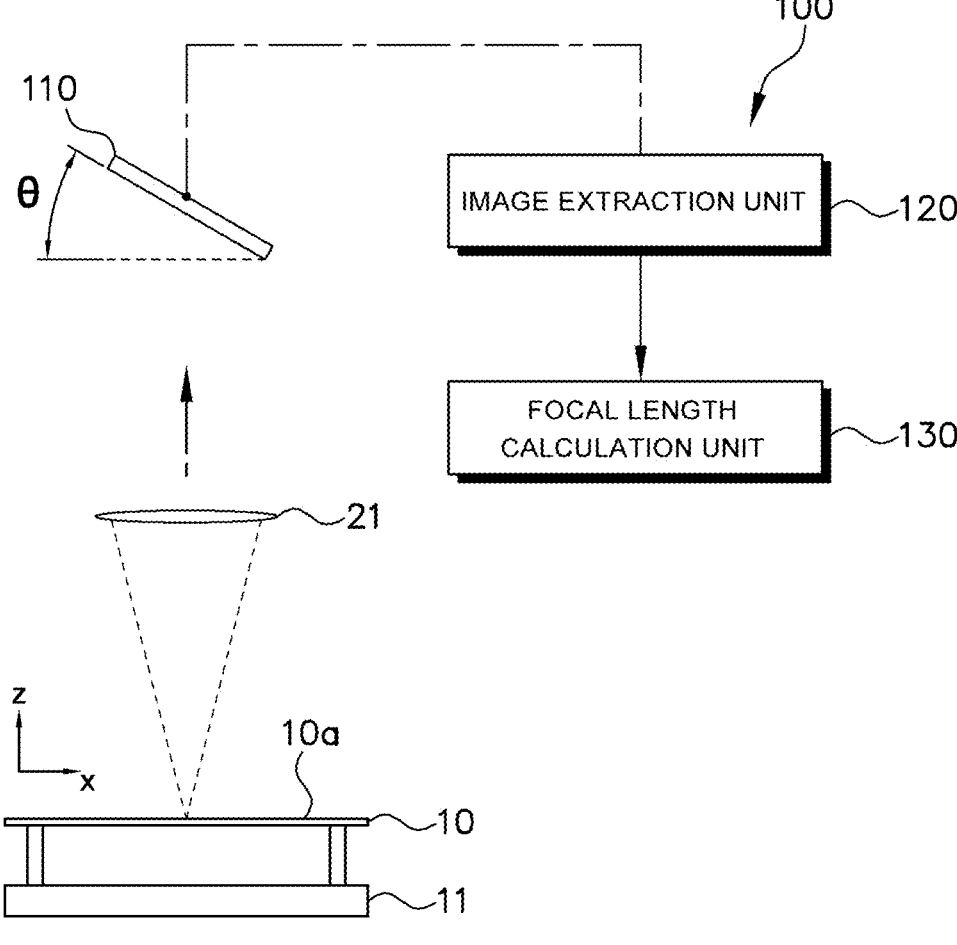
FIG. 2 is a diagram schematically illustrating the focal length measuring device according to an embodiment of the present disclosure.

FIG. 1 is a diagram schematically illustrating a structure of a laser processing device to which a focal length measuring device according to an embodiment of the present disclosure is applied, and FIG. 2 is a diagram schematically illustrating the focal length measuring device according to an embodiment of the present disclosure.

As illustrated in FIGS. 1 and 2, a focal length measuring device 100 according to an embodiment of the present disclosure may be provided in a work device 20 that performs work on a workpiece 10, and may be configured to include an image acquisition unit 110, an image extraction unit 120, and a focal length calculation unit 130. This focal length measuring device 100 may be provided in the work device 20 and may measure a focal length at which a lens 21 provided in the work device 20 is separated from the workpiece 10 so as to perform specific work.

An example of the work device 20 is a laser processing device such as a laser marking device or a laser welding device, but the present disclosure is not limited thereto, and the focal length measuring device 100 according to an embodiment of the present disclosure may be applied to various types of work devices that include an optical system such as the lens 21 so as to perform work on the workpiece 10.

The image acquisition unit 110 may be disposed in a movement path of light incident from the workpiece 10 through the lens 21 and may acquire an image from the workpiece 10 for which a focal length is to be measured. For convenience of explanation, FIG. 2 illustrates an example in which the workpiece 10 has a thin plate shape and a work surface 10a of the workpiece 10 is flat, but the present disclosure is not limited thereto, and the work surface 10a of the workpiece 10 may be curved.

Preferably, the image acquisition unit 110 may include a charge coupled device (CCD) image sensor as a sensor that converts light into an electrical signal so as to obtain an image.

Meanwhile, although not illustrated in detail, as illustrated in FIG. 2, the workpiece 10 is supported while being seated on a workpiece support 11 and may be moved in the X-axis, Y-axis, and Z-axis directions or rotated around the X-axis, Y-axis, and Z-axis by the workpiece support 11 as necessary. In addition, the image acquisition unit 110 may be moved in the X-axis, Y-axis and Z-axis directions or rotated around the X-axis, Y-axis and Z-axis by a separate driving device as necessary.

Figure 5:
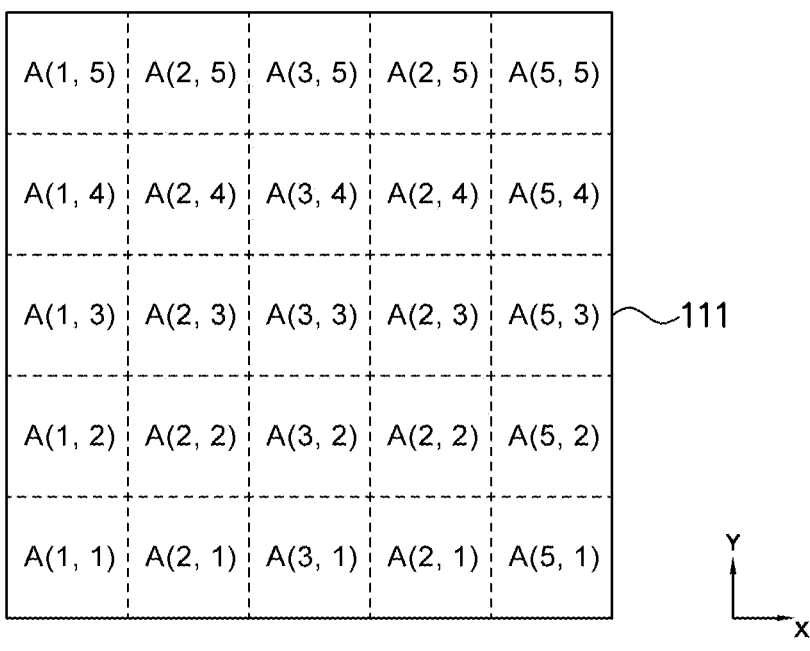
FIG. 5 is a diagram illustrating a state in which an image extraction unit constituting the focal length measuring device according to an embodiment of the present disclosure extracts a plurality of first divided images from an image.
Figure 5:
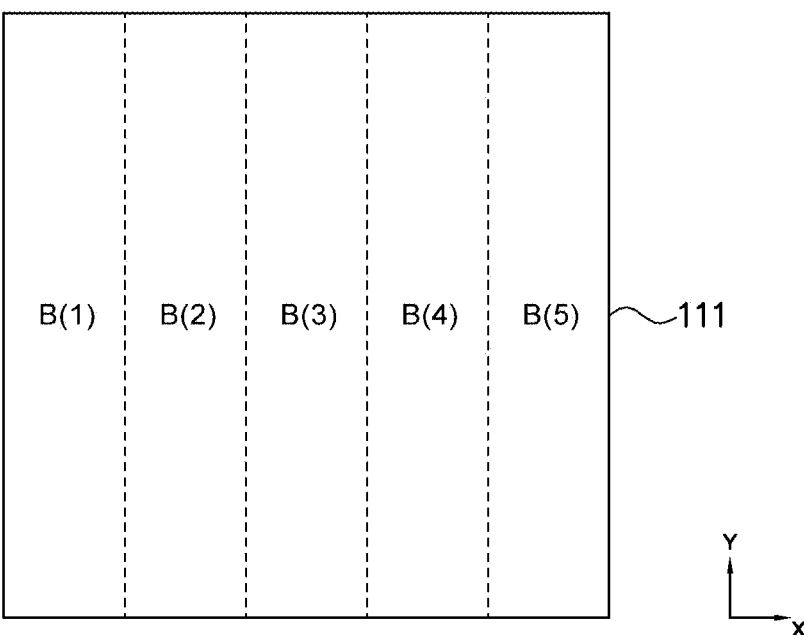
Figure 6:
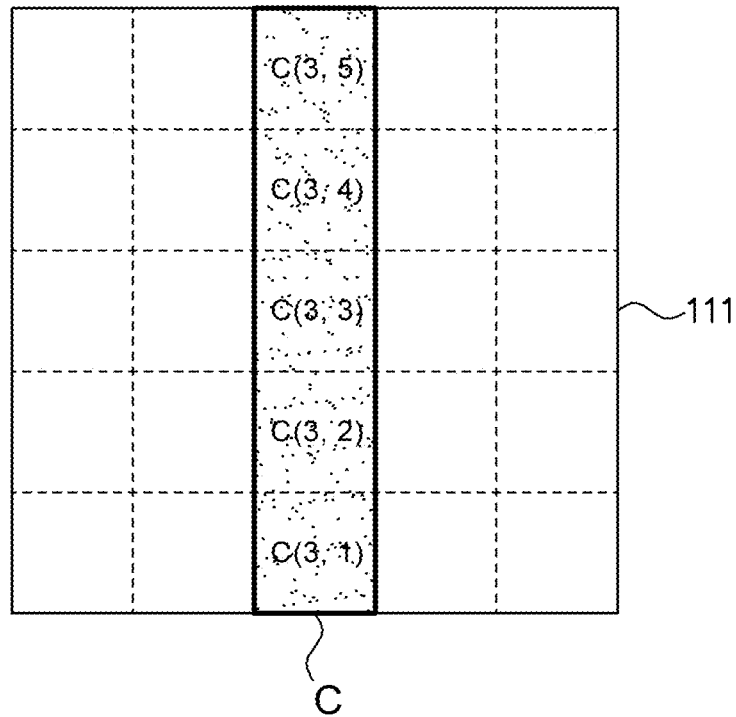
FIG. 6 is a diagram illustrating a state in which the image extraction unit constituting the focal length measuring device according to an embodiment of the present disclosure extracts at least one second divided image from the plurality of second divided images.

The image extraction unit 120 may extract a plurality of first divided images (A(1, 1) to A(5, 5) in the example of (a) of FIG. 5) from the image acquired by the image acquisition unit 110, and then select at least one second divided image (C(3, 1) to C(3, 5) in the example of (b) of FIG. 6) having a sharpness greater than or equal to a preset reference from among the plurality of first divided images.

Preferably, the image extraction unit 120 may extract the plurality of first divided images by dividing the entire area of the image into a first direction (X direction in the example of FIG. 1) that is perpendicular to the movement path of light incident from the workpiece 10 through the lens 21 and a second direction (Y direction in the example of FIG. 1) that is perpendicular to the first direction and the movement path of light incident from the workpiece 10 through the lens 21.

In addition, preferably, the image extraction unit 120 may perform a fast Fourier transform (FFT) operation to extract a plurality of frequencies for the plurality of first divided images, and then select at least one second divided image having the highest frequency from among the plurality of first divided images.

The method by which the image extraction unit 120 extracts the plurality of first divided images from the image and the method by which the image extraction unit 120 selects at least one second divided image from among the plurality of first divided images are described in detail below with reference to FIGS. 3 to 6.

The focal length calculation unit 130 may calculate the focal length (F in the example of FIG. 7) of the workpiece 10 from the position of each of the at least one second divided image selected by the image extraction unit 120. The method by which the focal length calculation unit 130 calculates the focal length of the workpiece 10 from the position of each of the at least one second divided image is described in detail below with reference to FIG. 3 and FIG. 7.

Preferably, as illustrated in FIG. 2, the image acquisition unit 110 constituting the focal length measuring device 100 according to an embodiment of the present disclosure may be disposed to have a preset angle θ with respect to a direction perpendicular to the movement path of light incident from the workpiece 10 through the lens 21.

That is, the image acquisition unit 110 is not disposed perpendicular to the movement path of light transmitting through the lens 21 to receive the light reflected from the work surface 10a of the workpiece 10 equally as a whole, but is disposed to have a preset angle with respect to a direction perpendicular to the movement path of light transmitting through the lens 21, so that the amount of light absorbed cannot but differ depending on the surface position.

Therefore, the focal length measuring device 100 according to an embodiment of the present disclosure may accurately measure the focal length of the work device 20 for the workpiece 10 and the height deviation from the work surface 10a of the workpiece 10, without movement of the workpiece 10 or with minimal movement thereof, due to the image acquisition unit 110 disposed obliquely in the movement path of light incident from the workpiece 10 through the lens 21.

Hereinafter, a method for measuring the focal length of the lens 21 provided in the work device 20 by using the focal length measuring device 100 according to an embodiment of the present disclosure is described with reference to FIGS. 3 to 7.

Figure 3:
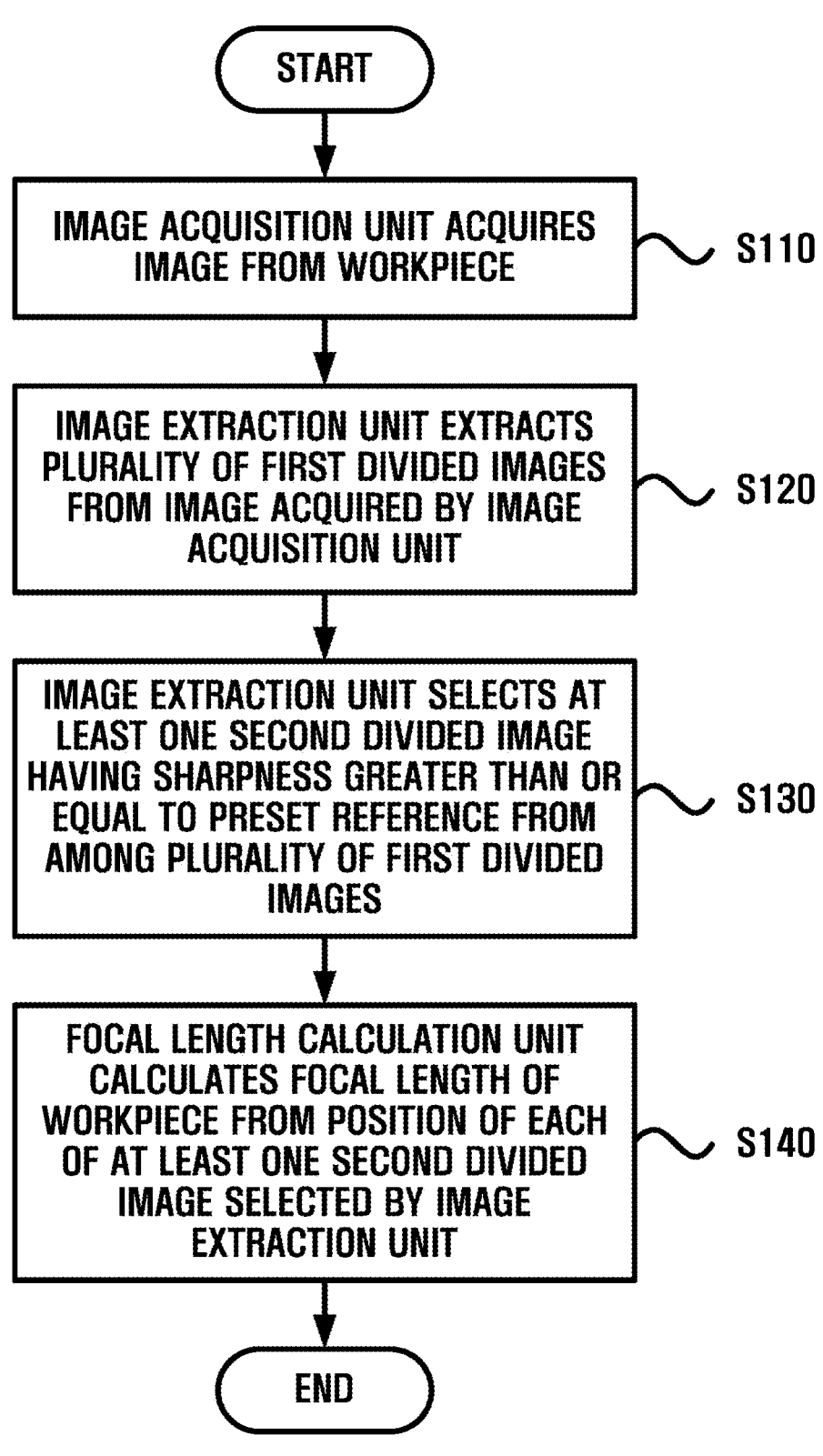
FIG. 3 is a flowchart showing a focal length measuring method using the focal length measuring device according to an embodiment of the present disclosure.

FIG. 3 is a flowchart showing a focal length measuring method using the focal length measuring device according to an embodiment of the present disclosure.

First, the image acquisition unit 110 may acquire the image from the workpiece 10 for which the focal length is to be measured (S110). As described above, the image acquisition unit 110 may include a CCD image sensor.

Figure 4:
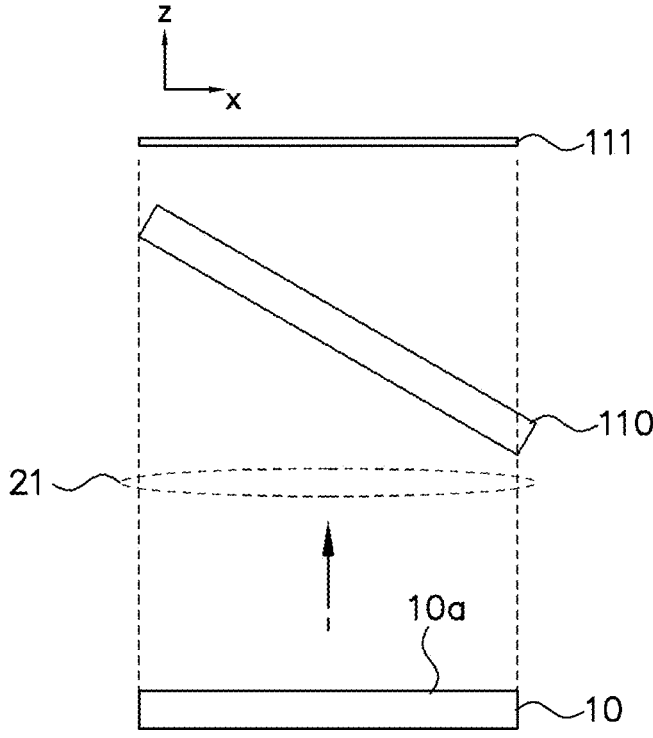
FIG. 4 is a diagram illustrating a state in which an image acquisition unit constituting the focal length measuring device according to an embodiment of the present disclosure acquires an image from a workpiece.

FIG. 4 is a diagram illustrating a state in which the image acquisition unit constituting the focal length measuring device according to an embodiment of the present disclosure acquires the image from the workpiece.

As illustrated in FIG. 4, the image acquisition unit 110 may be disposed to be inclined so as to have a preset angle θ with respect to a direction perpendicular to the movement path of light incident from the workpiece 10 through the lens 21. Accordingly, since the image acquisition unit 110 absorbs a different amount of light depending on the surface position, an image 111 acquired from the workpiece 10 cannot but have a difference in sharpness depending on the corresponding position of the image acquisition unit 110.

Referring again to FIG. 3, after the image acquisition unit 110 acquires the image 111 from the workpiece 10 (S110), the image extraction unit 120 may extract the plurality of first divided images from the image 111 acquired by the image acquisition unit 110 (S120).

FIG. 5 is a diagram illustrating a state in which the image extraction unit constituting the focal length measuring device according to an embodiment of the present disclosure extracts the plurality of first divided images from the image.

As illustrated in FIG. 5, the image extraction unit 120 may extract the plurality of first divided images by dividing the entire area of the image 111 into a first direction (X direction in the example of FIG. 1) that is perpendicular to the movement path of light incident from the workpiece 10 through the lens 21 and a second direction (Y direction in the example of FIG. 1) that is perpendicular to the first direction and the movement path of light incident from the workpiece 10 through the lens 21.

That is, the image extraction unit 120 may divide the entire area of the image 111 acquired by the image acquisition unit 110 into a plurality of division areas (M×N) corresponding to a predetermined size along the longitudinal and lateral directions of the image acquisition unit 110 and extract the plurality of first divided images.

As an example, (a) of FIG. 5 illustrates an example in which the image extraction unit 120 divides the entire area of the image 111 into five parts in the first direction (X direction) and five parts in the second direction (Y direction) and extract a total of 25 first divided images A(1, 1) to A(5, 5). Preferably, in order to increase accuracy when the image extraction unit 120 extracts sharpness (frequency in an example described below) for each of the plurality of first divided images, a pair of adjacent first divided images (e.g., A(2, 2) and A(3, 2)) from among the plurality of first divided images may be extracted so that certain areas of boundary portions thereof overlap each other.

(a) of FIG. 5 illustrates an example in which the entire area of the image 111 is divided into equal intervals and equal numbers in the first direction and the second direction, but the present disclosure is not limited thereto, and the intervals and numbers in the first direction and the second direction may be variously set according to conditions.

As another example, (b) of FIG. 5 illustrates an example in which the image extraction unit 120 divides the entire area of the image 111 into five parts only in the first direction (X direction) in which the image acquisition unit 110 is disposed obliquely, and extracts a total of five first divided images B(1) to B(5).

That is, when the work surface 10a of the workpiece 10 is flat, the image acquisition unit 110 is spaced apart from the workpiece 10 by substantially the same distance regardless of the position in the second direction (Y direction) perpendicular to the first direction in which the image acquisition unit 110 is disposed obliquely, and thus, the dividing in the second direction (Y direction) does not need to be considered. Therefore, in the example of (b) of FIG. 5, the image acquisition unit 110 may further simplify a subsequent process of selecting the second divided image by dividing the entire area of the image 111 only in the first direction (X direction).

Similarly, the pair of adjacent first divided images (e.g., B(2) and B(3)) from among the plurality of first divided images may be extracted so that certain areas of boundary portions overlap with each other.

Referring again to FIG. 3, after the image extraction unit 120 extracts the plurality of first divided images from the image 111 (S120), the image extraction unit 120 may select at least one second divided image having sharpness greater than or equal to a preset reference from among the plurality of first divided images (S130).

FIG. 6 is a diagram illustrating a state in which the image extraction unit constituting the focal length measuring device according to an embodiment of the present disclosure extracts at least one second divided image from the plurality of second divided images.

Preferably, as illustrated in FIG. 6, the image extraction unit 120 may perform an FFT operation to extract a plurality of frequencies for the plurality of first divided images, and then select at least one second divided image having the highest frequency from among the plurality of first divided images.

That is, as illustrated in (a) of FIG. 6, the image extraction unit 120 may perform an FFT operation on the 25 first divided images A(1, 1) to A(5, 5) illustrated in (a) of FIG. 5 to extract a plurality of frequencies f(1, 1) to f(5, 5) for the first divided images A(1, 1) to A(5, 5).

As illustrated in (b) of FIG. 6, the image extraction unit 120 may select at least one second divided image having the highest frequency, for example, five second divided images C(3, 1) to C(3, 5), from among the 25 first divided images A(1, 1) to A(5, 5).

Meanwhile, an example in which the image extraction unit 120 performs an FFT operation to select the at least one second divided image having the highest frequency from among the plurality of first divided images is illustrated, but the present disclosure is not limited thereto.

For example, the image extraction unit 120 may calculate a pixel value of each of the plurality of first divided images extracted from the image 111, and then select at least one second divided image having a large deviation in pixel value, compared to adjacent first divided images, from among the plurality of first divided images.

Referring again to FIG. 3, after the image extraction unit 120 selects the at least one second divided image (S130), the focal length calculation unit 130 may calculate the focal length of the workpiece 10 from the position of each of the at least one second divided image selected by the image extraction unit 120 (S140).

Figure 7:
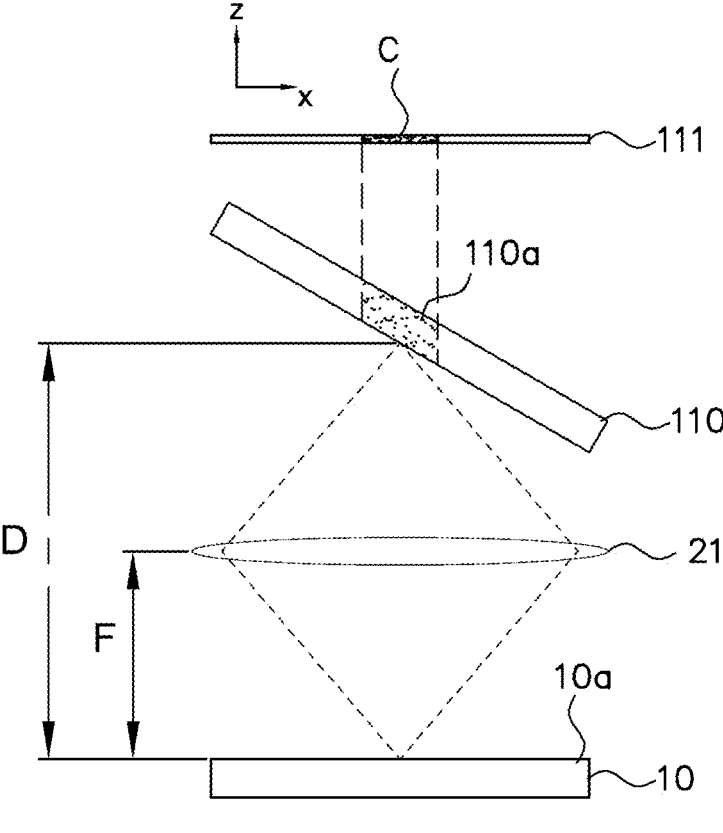
FIG. 7 is a diagram illustrating a state in which a focal length calculation unit constituting the focal length measuring device according to an embodiment of the present disclosure calculates a focal length of a workpiece from the at least one second divided image.

FIG. 7 is a diagram illustrating a state in which the focal length calculation unit constituting the focal length measuring device according to an embodiment of the present disclosure calculates the focal length of the workpiece from the at least one second divided image.

As illustrated in FIG. 7, the focal length calculation unit 130 may calculate a focal length F of the workpiece 10 from a distance D between a portion 110a of the image acquisition unit 110 corresponding to a position C of each of the at least one second divided image and the work surface 10a of the workpiece 10.

For example, in the example of FIG. 7, the focal length F of the workpiece 10 corresponds to half of the distance D between the portion 110a of the image acquisition unit 110 corresponding to the position C of the five second divided images C(3, 1) to C(3, 5) and the work surface 10a of the workpiece 10.

Meanwhile, the focal length measuring device 100 according to an embodiment of the present disclosure may further include a position adjustment unit 140 for adjusting the positions of the image acquisition unit 110 and the workpiece 10.

Figure 8:
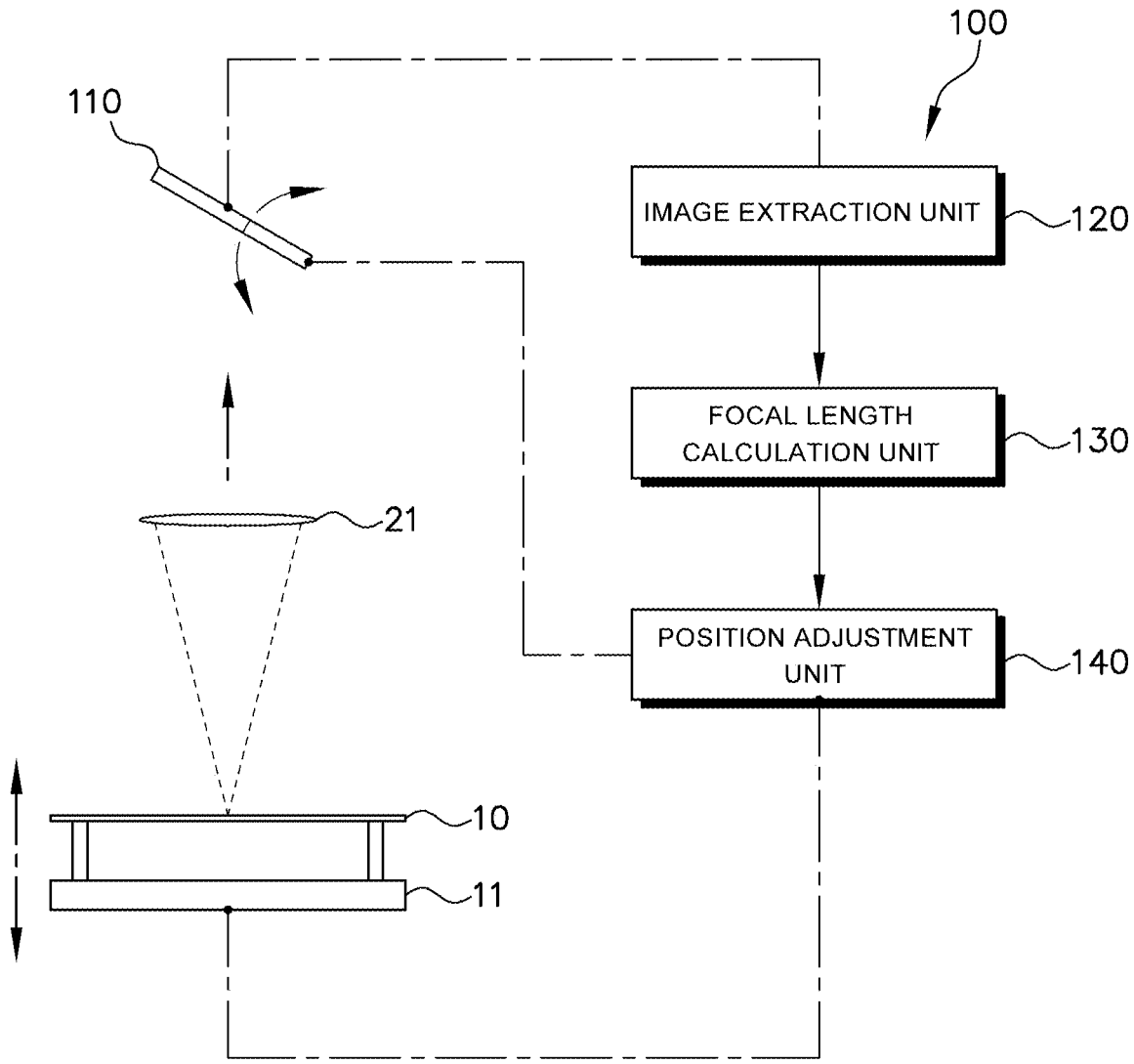
FIG. 8 is a diagram schematically illustrating a modification of the focal length measuring device according to an embodiment of the present disclosure.
Figure 9:
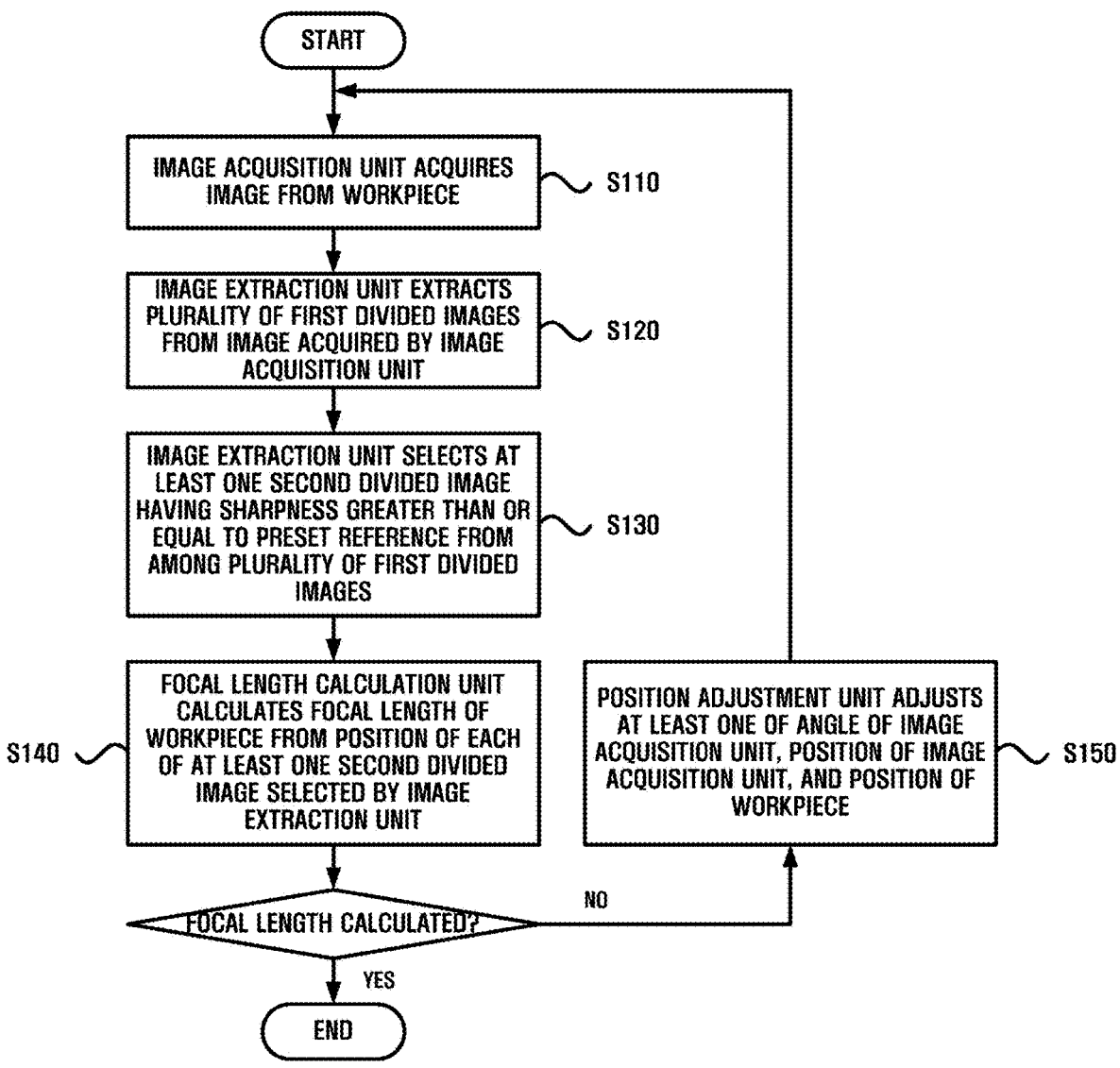
FIG. 9 is a flowchart showing a focal length measuring method using the modification of the focal length measuring device according to an embodiment of the present disclosure.

FIG. 8 is a diagram schematically illustrating a modification of the focal length measuring device according to an embodiment of the present disclosure, and FIG. 9 is a flowchart showing a focal length measuring method using the modification of the focal length measuring device according to an embodiment of the present disclosure.

As illustrated in FIG. 8, the position adjustment unit 140 may adjust at least one of the angle of the image acquisition unit 110, the position of the image acquisition unit 110, and the position of the workpiece 10 according to the calculation result of the focal length calculation unit 130.

That is, as illustrated in FIG. 9, the focal length measuring method using the modification of the focal length measuring device 100 according to an embodiment of the present disclosure may further include, after a step S140 in which the focal length calculation unit 130 of FIG. 3 calculates the focal length of the workpiece 10, a step (S150) in which the position adjustment unit 140 connected to the image acquisition unit 110 and the workpiece 10 adjusts at least one of the angle of the image acquisition unit 110, the position of the image acquisition unit 110, and the position of the workpiece 10 according to the calculation result of the focal length calculation unit 130.

That is, as illustrated in FIG. 9, when the focal length of the workpiece 10 is not calculated as the result of calculating the focal length of the workpiece 10 in the focal length calculation unit 130, the work device 20 is in a state in which the work device 20 cannot perform work on the workpiece 10, and thus, it is necessary to readjust the position of the workpiece 10 or the position of the work device 20.

Accordingly, when the focal length of the workpiece 10 is not calculated as the result of calculating the focal length of the workpiece 10 in the focal length calculation unit 130, the position adjustment unit 140 may adjust the angle of the image acquisition unit 110, the position of the image acquisition unit 110 in the Z-axis direction, or the position of the workpiece 10 in the Z-axis direction.

Accordingly, the focal length measuring device 100 according to an embodiment of the present disclosure may divide the image of the workpiece 10, which is acquired by the image acquisition unit 110 disposed obliquely in the movement path of light incident from the workpiece 10 through the lens 21, into the plurality of first divided images, and then calculate the focal length of the workpiece 10 by using the sharpness of each of the plurality of first divided images, thereby easily and accurately measuring the focal length of the work device 20 with respect to the workpiece 10 with a simpler structure and control method.

Meanwhile, the laser processing device has been described as an example of the work device 20, but the present disclosure is not limited thereto, and the present disclosure may be applied to various types of systems, for example, processing devices using robots as well as laser processing devices such as laser marking devices or laser welding devices.

Meanwhile, the present specification and drawings disclose preferred embodiments of the present disclosure. Although specific terms are used, these terms are used only in a general sense to easily explain the technical concept of the present disclosure and help understanding of the present disclosure and are not intended to limit the scope of the present disclosure. In addition to the embodiments disclosed herein, it will be apparent to those of ordinary skill in the art that other modifications based on the technical idea of the present disclosure are possible.

INDUSTRIAL APPLICABILITY

The present disclosure relates to a focal length measuring device and method. More specifically, the present disclosure may be applied to the technical field related to a focal length measuring device and method capable of easily and accurately measuring a focal length of a work device with respect to a workpiece with a simpler structure and control method.

The invention claimed is:

1. A focal length measuring device, which is provided in a work device that performs work on a workpiece, and measures a focal length at which a lens provided in the work device is separated from the workpiece, the focal length measuring device comprising:

an image acquisition unit disposed in a movement path of light incident from the workpiece through the lens and configured to acquire an image from the workpiece;

an image extraction unit configured to extract a plurality of first divided images from the image acquired by the image acquisition unit and select at least one second divided image having a sharpness greater than or equal to a preset reference from among the plurality of first divided images; and a focal length calculation unit configured to calculate a focal length of the workpiece from a position of each of the at least one second divided image selected by the image extraction unit, wherein the image acquisition unit is disposed to have a preset angle with respect to a direction perpendicular to the movement path of the light incident from the workpiece through the lens.

2. The focal length measuring device of claim 1, wherein the image acquisition unit comprises a charge coupled device (CCD) image sensor.

3. The focal length measuring device of claim 1, wherein the image extraction unit is configured to extract the plurality of first divided images by dividing an entire area of the image into a first direction perpendicular to the movement path of the light incident from the workpiece through the lens and a second direction perpendicular to the first direction and the movement path of the light incident from the workpiece through the lens.

4. The focal length measuring device of claim 1, wherein the image extraction unit is configured to perform a fast Fourier transform (FFT) operation to extract a plurality of frequencies for the plurality of first divided images, and select at least one second divided image having a highest frequency from among the plurality of first divided images.

5. The focal length measuring device of claim 1, wherein the focal length measuring device further comprises a position adjustment unit configured to adjust at least one of an angle of the image acquisition unit, a position of the image acquisition unit, and a position of the workpiece according to a calculation result of the focal length calculation unit.

6. A focal length measuring method for measuring a focal length at which a lens provided in a work device that performs work on a workpiece is separated from the workpiece, the focal length measuring method comprising:

a step in which an image acquisition unit disposed in a movement path of light incident from the workpiece through the lens acquires an image from the workpiece;

a step in which an image extraction unit extracts a plurality of first divided images from the image acquired by the image acquisition unit;

a step in which the image extraction unit selects at least one second divided image having a sharpness greater than or equal to a preset reference from among the plurality of first divided images; and a step in which a focal length calculation unit calculates a focal length of the workpiece from a position of each of the at least one second divided image selected by the image extraction unit, wherein the image acquisition unit is disposed to have a preset angle with respect to a direction perpendicular to the movement path of the light incident from the workpiece through the lens.

7. The focal length measuring method of claim 6, wherein the step in which the image extraction unit extracts the plurality of first divided images comprises a step in which the image extraction unit extracts the plurality of first divided images by dividing an entire area of the image into a first direction perpendicular to the movement path of the light incident from the workpiece through the lens and a second direction perpendicular to the first direction and the movement path of the light incident from the workpiece through the lens.

8. The focal length measuring method of claim 6, wherein the step in which the image extraction unit selects the at least one second divided image comprises:

a step in which the image extraction unit performs a fast Fourier transform (FFT) operation to extract a plurality of frequencies for the plurality of first divided images; and a step in which the image extraction unit selects at least one second divided image having a highest frequency from among the plurality of first divided images.

9. The focal length measuring method of claim 6, further comprising, after the step in which the focal length calculation unit calculates the focal length of the workpiece, a step in which a position adjustment unit connected to the image acquisition unit and the workpiece adjusts at least one of an angle of the image acquisition unit, a position of the image acquisition unit, and a position of the workpiece according to a calculation result of the focal length calculation unit.

* * * * *